Sept. 7, 1948.  T. X. LEWIS  2,448,813
POWER SYSTEM
Filed Dec. 29, 1945
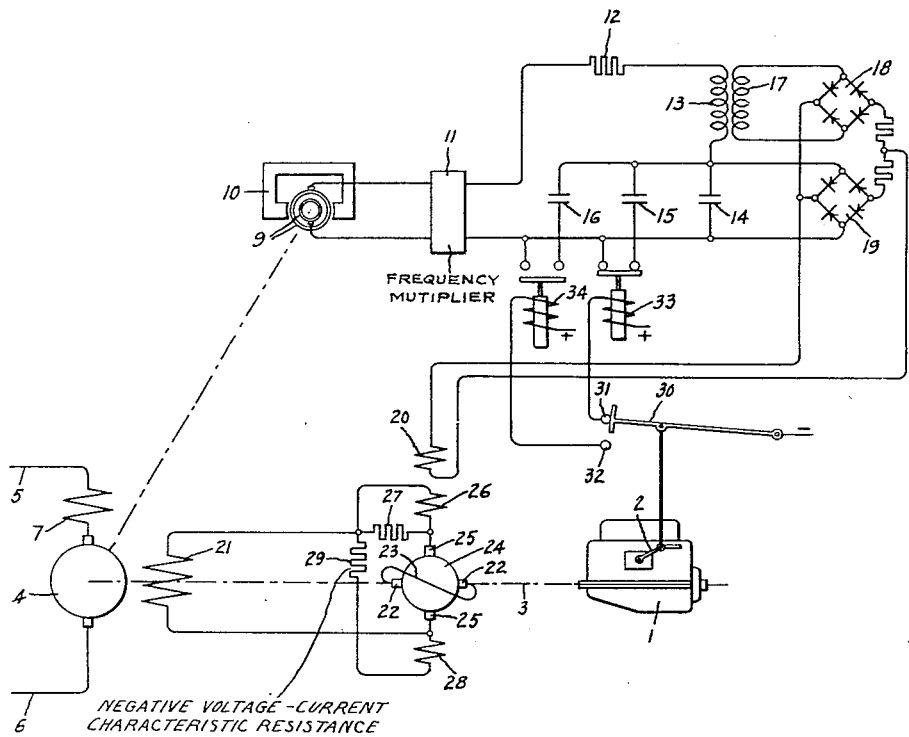
Inventor:
Thomas X. Lewis,
by Browell V. Mack
His Attorney.

Patented Sept. 7, 1948

2,448,813

UNITED STATES PATENT OFFICE 2,448,813

POWER SYSTEM

Thomas X. Lewis, Rugby, England, assignor to General Electric Company, a corporation of New York Application December 29, 1945, Serial No. 638,377
In Great Britain November 17, 1944

Section 1, Public Law 690, August 8, 1946
Patent expires November 17, 1964

13 Claims. (Cl. 290—17)

1

My invention relates to power systems and particularly to an arrangement for controlling the output of a generator driven by a prime mover to prevent overloading of the generator and prime mover and is provided with an arrangement for automatically adjusting the excitation of the main generator to control its loading responsive to different throttle settings of the prime mover.

In power systems utilizing an engine generator source of power, such as is used in traction systems, wide variations in load often occur on the driving motors, and it is desirable that the control be such that the prime mover and the main generator are not subjected to over- or underloading throughout the working range of the main generator.

An object of my invention is to provide an improved power system for maintaining a substantially predetermined load on the prime mover for any given throttle setting.

Another object of my invention is to provide an improved power system including a main generator and a prime mover for driving the main generator with means for automatically controlling the power on the prime mover to predetermined values for various throttle settings of the prime mover.

Further objects and advantages of my invention will become apparent and my invention will be better understood from the following description referring to the accompanying drawing, and the features of novelty which characterize my invention will be pointed out with particularity in the claims annexed to and forming part of this specification.

The drawing schematically illustrates a power system provided with an embodiment of my improved power system.

Referring to the drawing, I have shown an embodiment of my improved power system in which a prime mover such as an engine 1, provided with a power controlling throttle 2, is connected by any suitable coupling arrangement 3 to a main generator armature 4 which is adapted to supply power to a load, such as traction motors, through leads 5 and 6. This generator preferably is of the direct current type and is provided with a commutating field exciting winding 7 connected in series with the armature 4.

In order to control the loading on the main generator 4 and, therefore, on the prime mover 1, I provide an auxiliary alternating current generator which is adapted to operate as a tachometer responsive to the speed of the main generator 4. This tachometer generator is provided

2 with an armature having slip rings 9 connected to a tuned circuit which is adapted to be resonant at a predetermined frequency. Excitation of the tachometer generator may be suitably provided by any conventional arrangement, such as a permanent magnet field member 10, such that the frequency output of the tachometer generator is directly responsive to the speed of the main generator 4. If desired, the frequency output of the tachometer generator may be connected to the tuned circuit through a frequency multiplier 11 of any suitable conventional type whose output is connected to the resonant circuit through a non-inductive resistor 12. In the illustrated arrangement, the resonant or tuned circuit comprises an inductance formed by the primary 13 of a transformer and by a plurality of capacitors 14, 15 and 16. The output of the resonant circuit is utilized to control the excitation of the main generator and thus to adjust the load on the prime mover. In order to obtain a large change in the current output of the resonant circuit, the outputs of the inductive branch and the capacitive branch are preferably separately rectified, and the separate rectifiers are connected together so that the difference in the voltages between them is utilized to control the excitation of the main generator. In this arrangement, the voltage of the inductive branch of the series resonant circuit is obtained from a secondary winding 17 of the transformer which is coupled to the primary winding 13 and is rectified through a suitable full-wave rectifier 18, while the capacitive voltage of the resonant circuit is rectified through a suitable rectifier 19, and these two rectifiers are connected together across a main control field exciting winding 20 of an exciter for a main control field exciting winding 21 of the main generator 4.

The exciter in this system may be of any suitable conventional type, and preferably, I utilize a machine of the armature reaction excited type provided with a set of primary brushes 22 which are short circuited by an electrical conductor 23 to provide a component of excitation to the armature 24 which will induce a voltage between a set of secondary brushes 25 which is greatly amplified over the voltage between the primary brushes 22. In this manner, a relatively small excitation need be provided by the control field exciting winding 20 to generate the desired voltage between the secondary brushes 25 of the exciter. These secondary brushes 25 are connected across the main generator field exciting winding 21 such that the excitation provided by this field exciting winding 21 will be maintained at a predetermined value and thereby regulate the loading on the main generator for any given speed thereof. The exciter shown in this drawing is provided with a stabilizing field exciting winding 26 which is connected across a resistor 27 and is adapted to minimize the effect of transient speed variations on the output of the exciter. In addition, the exciter may be provided with a current limiting field exciting winding 28 connected across the main generator field exciting winding 21 through a negative voltage-current characteristic resistance 29, such that the field exciting winding will tend to buck down the voltage of the exciter if the current through the main generator field exciting winding 21 exceeds a predetermined safe operating value. In this manner, the tachometer generator which is responsive to the speed of the main generator 4 provides a source of alternating current responsive in frequency to the speed of the main generator which is supplied to the resonant circuit and is rectified to energize the controlling field exciting winding 20 of the exciter which operates as an amplifier for energizing the field exciting winding 21 of the main generator 4, and thereby controls the output of the main generator in accordance with the speed thereof. Thus, if the load on the main generator becomes too great and the speed of the generator falls below the desired value for the setting of the throttle 2 of the engine, the frequency of the tachometer generator decreases and the excitation provided by the resonant circuit decreases very rapidly with the result that the voltage generated by the exciter armature 24 is correspondingly decreased and the excitation supplied by the main generator field exciting winding 21 also is decreased, which results in a decrease in the load on the main generator, thereby preventing overloading of the prime mover 1. Conversely, if the load on the main generator 4 for a given throttle setting of the prime mover is decreased such that the speed of the main generator increases over a predetermined value for a given throttle setting, the frequency of the tachometer generator becomes such that the excitation of the main generator field exciting winding 21 is increased, tending to increase the load on the main generator to utilize the prime mover 1 at its maximum efficiency.

In order to provide for different loading of the main generator with different throttle settings of the prime mover, an arrangement is provided for varying the resonant frequency of the resonant circuit responsive to the setting of the throttle by varying the capacitance of the resonant circuit. In the illustrated arrangement, this is obtained by providing a control circuit which is operable by the throttle 2. A suitable switch having a contactor 30 adapted to complete a circuit through contacts 31 and 32 is provided for energizing the coils of relays 33 and 34, respectively. As shown, for a given throttle setting, the contactor 30 may open circuit the connections for both of the relay coils 33 and 34, such that only the capacitor 14 is connected in the resonant circuit, and for other settings of the throttle 2, the contactor 30 may close a circuit through the contacts 31 or through both the contacts 31 and 32 so as to include either only the capacitor 15 or both the capacitors 15 and 16, respectively, in parallel circuit with the permanently connected capacitor 14, thereby varying the resonant frequency of the tuned circuit with different settings of the throttle, so as to maintain substantially a predetermined loading on the main generator 4 for any predetermined throttle setting of the prime mover 1 to prevent overloading or underloading of the power system and to utilize the equipment at its maximum efficiency.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A power system including a prime mover having a throttle control, a main generator, means for providing a source of alternating current responsive in frequency to the speed of said main generator, means including a resonant circuit connected to said alternating current source and arranged to provide a predetermined voltage at a predetermined frequency of said alternating current source corresponding to a predetermined speed of operation of said main generator, and means responsive to the voltage of said resonant circuit for providing a predetermined excitation to said main generator maintaining a predetermined loading thereon for a given setting of said throttle.

2. A power system including a prime mover having a throttle control, a main generator, an exciter having a control field exciting winding, means for providing a source of alternating current responsive in frequency to the speed of said main generator, means including a resonant circuit connected to said alternating current source and arranged to provide a predetermined voltage at a predetermined frequency of said alternating current source corresponding to a predetermined speed of operation of said main generator, means for rectifying the voltage of said resonant circuit, and means connecting said exciter control field exciting winding for energization by the rectified voltage of said resonant circuit for providing a predetermined excitation to said main generator maintaining a predetermined loading thereon.

3. A power system including a prime mover having a throttle control, a generator, an exciter, means for providing a source of alternating current responsive in frequency to the speed of said generator, means including a resonant circuit connected to said alternating current source and arranged to provide a predetermined voltage at a predetermined frequency of said alternating current source corresponding to a predetermined speed of operation of said main generator, means for rectifying the voltage of said resonant circuit, means for exciting said exciter by the rectified voltage of said resonant circuit, and means for varying the resonant frequency of said resonant circuit responsive to the setting of said throttle for varying the predetermined loading of said generator to values corresponding to other throttle settings.

4. A power system including a prime mover having a throttle control, a main generator, means for providing a source of alternating current responsive in frequency to the speed of said main generator, means including a resonant circuit connected to said alternating current source and arranged to provide a predetermined voltage at a predetermined frequency of said alternating current source corresponding to a predetermined speed of operation of said main generator, means responsive to the voltage of said resonant circuit for providing a predetermined excitation to said main generator maintaining a predetermined loading thereon for a given setting of said throttle, and means for varying the resonant frequency of said resonant circuit responsive to the setting of said throttle for varying the predetermined loading of said generator to values corresponding to the throttle setting.

5. A power system including a prime mover having a throttle control, a main generator having a field exciting winding, means including an exciter connected to energize said generator field exciting winding for maintaining a predetermined load on said generator and prime mover for a given throttle setting, means providing a source of alternating current responsive in frequency to the speed of said main generator, means including a resonant circuit connected to said alternating current source and arranged to provide a predetermined voltage at a predetermined frequency of said alternating current source, means for exciting said exciter by said resonant circuit voltage, means for controlling the setting of said throttle, and means varying the capacity of said resonant circuit responsive to the setting of said throttle for varying the predetermined loading of said generator to other predetermined values corresponding to other throttle settings.

6. A power system including a prime mover having a throttle power control, a main generator having a field exciting winding, means including an exciter of the armature reaction excitation type connected to energize said generator field exciting winding for maintaining a predetermined load on said generator and prime mover for a given throttle setting, a main control field exciting winding for said exciter, means including an alternating current tachometer generator for providing a source of alternating current responsive in frequency to the speed of said main generator, means including a series resonant circuit connected to said alternating current source and arranged to provide a predetermined voltage at a predetermined frequency of said alternating current source corresponding to a predetermined speed of operation of said main generator, and means connecting said exciter main control field exciting winding for energization by said resonant circuit voltage for providing a predetermined excitation to said main generator field exciting winding by said exciter maintaining a predetermined loading thereon.

7. A power system including a prime mover having a throttle control, a main generator, an exciter having a control field exciting winding, means for providing a source of alternating current responsive in frequency to the speed of said main generator, means including a resonant circuit connected to said alternating current source and arranged to provide a predetermined voltage at a predetermined frequency of said alternating current source corresponding to a predetermined speed of operation of said main generator, means for rectifying the voltage of said resonant circuit, means connecting said exciter control field exciting winding for energization by the rectified voltage of said resonant circuit for providing a predetermined excitation to said main generator maintaining a predetermined loading thereon for a given setting of said throttle, and means for varying the resonant frequency of said resonant circuit responsive to the setting of said throttle for varying the predetermined loading of said generator to values corresponding to the throttle setting.

8. A power system including a prime mover having a throttle power control, a generator having a field exciting winding, means including an exciter connected to energize said generator field exciting winding for maintaining a predetermined load on said generator and prime mover for a given throttle setting, means providing a source of alternating current responsive in frequency to the speed of said generator, means including a resonant circuit connected to said alternating current source and arranged to provide a predetermined voltage at a predetermined frequency of said alternating current source, means for exciting said exciter by said resonant circuit voltage providing a predetermined excitation to said generator field exciting winding by said exciter maintaining a predetermined loading thereon, means for controlling the setting of said throttle, and means varying the capacity of said resonant circuit responsive to the setting of said throttle for varying the predetermined loading of said generator to other predetermined values corresponding to other throttle settings.

9. A power system including a prime mover having a throttle control, a main generator having a field exciting winding, means connected to energize said generator field exciting winding for maintaining a predetermined load on said generator and prime mover for a given throttle setting, means providing a source of alternating current responsive in frequency to the speed of said main generator, means including a resonant circuit connected to said alternating current source and arranged to provide a predetermined voltage at a predetermined frequency of said alternating current source corresponding to a predetermined speed of operation of said main generator, means connecting said generator field exciting winding energizing means to be energized by the voltage of said resonant circuit for providing a predetermined excitation to said main generator field exciting winding by said energizing means maintaining a predetermined loading thereon, means for controlling the setting of said throttle, and means for varying the resonant frequency of said resonant circuit responsive to the setting of said throttle for varying the predetermined loading of said generator to other predetermined values corresponding to other throttle settings.

10. A power system including a prime mover having a throttle power control, a main generator having a field exciting winding, means including an exciter of the armature reaction excitation type connected to energize said generator field exciting winding for maintaining a predetermined load on said generator and prime mover for a given throttle setting, means including an alternating current tachometer generator for providing a source of alternating current responsive in frequency to the speed of said main generator, means including a series resonant circuit connected to said alternating current source and arranged to provide a predetermined voltage at a predetermined frequency of said alternating current source corresponding to a predetermined speed of operation of said main generator, means for exciting said exciter responsive to said resonant circuit voltage, means for controlling the setting of said throttle, and means varying the capacity of said resonant circuit responsive to the setting of said throttle for varying the predetermined loading of said generator to other predetermined values corresponding to other throttle settings.

11. A power system including a prime mover having a throttle power control, a main generator having a field exciting winding, means including an exciter connected to energize said generator field exciting winding for maintaining a predetermined load on said generator and prime mover for a given throttle setting, a main control field exciting winding for said exciter, means providing a source of alternating current responsive in frequency to the speed of said main generator, means including a resonant circuit connected to said alternating current source and arranged to provide a predetermined voltage at a predetermined frequency of said alternating current source corresponding to a predetermined speed of operation of said main generator, means connecting said exciter main control field exciting winding for energization by said resonant circuit voltage for providing a predetermined excitation to said main generator field exciting winding by said exciter maintaining a predetermined loading thereon, means for controlling the setting of said throttle, and means varying the capacity of said resonant circuit responsive to the setting of said throttle for varying the predetermined loading of said generator to other predetermined values corresponding to other throttle settings.

12. A power system including a prime mover having a throttle power control, a main generator having a field exciting winding, means including an exciter connected to energize said generator field exciting winding for maintaining a predetermined load on said generator and prime mover for a given throttle setting, a control field exciting winding for said exciter, means providing a source of alternating current responsive in frequency to the speed of said main generator, means including a resonant circuit connected to said alternating current source and arranged to provide a predetermined voltage at a predetermined frequency of said alternating current source corresponding to a predetermined speed of operation of said main generator, means connecting said exciter control field exciting winding for energization by said resonant circuit voltage for providing a predetermined excitation to said main generator field exciting winding by said exciter maintaining a predetermined loading thereon, means for controlling the setting of said throttle, and means varying the capacity of said resonant circuit responsive to the setting of said throttle for varying the predetermined loading of said generator to other predetermined values corresponding to other throttle settings.

13. A power system including a prime mover having a throttle power control, a main generator having a field exciting winding, means including an exciter of the armature reaction excitation type connected to energize said generator field exciting winding for maintaining a predetermined load on said generator and prime mover for a given throttle setting, a main control field exciting winding for said exciter, means including an alternating current tachometer generator for providing a source of alternating current responsive in frequency to the speed of said main generator, means including a series resonant circuit connected to said alternating current source and arranged to provide a predetermined voltage at a predetermined frequency of said alternating current source corresponding to a predetermined speed of operation of said main generator, means connecting said exciter main control field exciting winding for energization by said resonant circuit voltage for providing a predetermined excitation to said main generator field exciting winding by said exciter maintaining a predetermined loading thereon, means for controlling the setting of said throttle, and means varying the capacity of said resonant circuit responsive to the setting of said throttle for varying the predetermined loading of said generator to other predetermined values corresponding to other throttle settings.

THOMAS X. LEWIS.

REFERENCES CITED

The following references are of record in the file of this patent:

UNITED STATES PATENTS

| Number | Name | Date |
| --- | --- | --- |
| 1,216,237 | Lemp | Feb. 13, 1917 |
| 1,820,864 | Neuland | Aug. 25, 1931 |
| 1,821,827 | Brandenstein | Sept. 1, 1931 |
| 1,899,193 | Godsey, Jr. | Feb. 28, 1933 |
| 2,368,456 | Edwards | Jan. 30, 1945 |
| 2,393,618 | Edwards et al. | Jan. 29, 1946 |
| 2,393,620 | Adams et al. | Jan. 29, 1946 |

FOREIGN PATENTS

| Number | Country | Date |
| --- | --- | --- |
| 453,207 | Great Britain | Sept. 7, 1936 |